US012669375B1

(12) United States Patent
Alodhayb et al.

(10) Patent No.: US 12,669,375 B1
(45) Date of Patent: Jun. 30, 2026

(54) TUNABLE MWIR CAMERA USING PIXELS WITH NANO SENSORS

(71) Applicant: KING SAUD UNIVERSITY, Riyadh (SA)

(72) Inventors: Abdullah Nasser Alodhayb, Riyadh (SA); Hamad Albrithen, Riyadh (SA); Nahed Abdullah Alarifi, Riyadh (SA); Adham Mohammed Aleid, Riyadh (SA); Khalid Abdullah Alhussaini, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 29 days.

(21) Appl. No.: 19/081,183

(22) Filed: Mar. 17, 2025

(51) Int. Cl.
| | |
|---|---|
| *G01J 3/28* | (2006.01) |
| *B82Y 15/00* | (2011.01) |
| *H04N 23/20* | (2023.01) |

(52) U.S. Cl.
CPC ........... *G01J 3/2823* (2013.01); *G01J 3/2803* (2013.01); *H04N 23/20* (2023.01); *B82Y 15/00* (2013.01)

(58) Field of Classification Search
CPC ............................. G01J 3/2823; G01J 3/2803
See application file for complete search history.

(56) References Cited

U.S. PATENT DOCUMENTS

| | | | | |
|---|---|---|---|---|
| 5,450,053 | A | * | 9/1995 | Wood ........................ H01Q 5/42 |
| | | | | 338/14 |
| 10,908,025 | B2 | | 2/2021 | Bekyarova et al. |
| 2011/0049368 | A1 | * | 3/2011 | Streuber ................... G01J 9/00 |
| | | | | 250/341.6 |
| 2017/0330978 | A1 | * | 11/2017 | Sugino ..................... G01J 5/046 |
| 2020/0393456 | A1 | | 12/2020 | Alexandrakis et al. |
| 2021/0381894 | A1 | * | 12/2021 | Colli ...................... H10F 39/107 |
| 2022/0178756 | A1 | | 6/2022 | Khan et al. |
| 2023/0253431 | A1 | | 8/2023 | O'Masta et al. |
| 2023/0266291 | A1 | | 8/2023 | Myrick |
| 2024/0032152 | A1 | * | 1/2024 | Carr ..................... H05B 1/0213 |

FOREIGN PATENT DOCUMENTS

| | | | | | |
|---|---|---|---|---|---|
| CN | 114324225 | A | * | 4/2022 | ............... G01J 3/12 |
| CN | 116908932 | A | * | 10/2023 | ............... G01V 8/10 |
| CN | 221039451 | U | * | 5/2024 | |

\* cited by examiner

*Primary Examiner* — Casey Bryant
(74) *Attorney, Agent, or Firm* — Nath, Goldberg & Meyer; Joshua B. Goldberg

(57) ABSTRACT

A nano sensor having a length, width, and depth, the nano sensor extending from a support structure. The nano sensor including a pixel on a portion of the nano sensor. The nano sensor may be coated with an infrared sensitive material and the nano sensor may be tunable by varying a thickness of the infrared sensitive material. An infrared (IR) imaging system. The system may include an array of nano sensors, and the nano sensors may include pixels. The nano sensors may be coated with an infrared sensitive material selected from the group consisting of vanadium oxide (VOx) and molybdenum disulfide ($MoS_2$). The system may operate on a middle-wave infrared structure (MWIR).

18 Claims, 6 Drawing Sheets

L(21)=100 µW       Surface: Temperature (K)

L(21)=100 uW            Mesh: Volume versus length

L(21)=100μW            Solid: displacemnt (μm) (x100 scale)

TUNABLE MWIR CAMERA USING PIXELS WITH NANO SENSORS

BACKGROUND

The disclosure of the present patent application relates to infrared cameras, and particularly to an infrared camera for the middle-wave infrared (MWIR) range.

DESCRIPTION OF THE RELATED ART

Infrared (IR) imaging technology detects the electromagnetic radiation within the infrared spectrum. IR imaging is essential in many sectors, such as military and civil defense and security, biomedical sensing, optical communication, and chemical sensing. The IR imaging technology is generally divided into different major bands: near-infrared (NIR), short-wave infrared (SWIR), middle-wave infrared (MWIR), and very long-wave infrared (VLWIR). Each band handles different applications and has unique features.

The focus on enhancing material properties and device designs in IR detector technology has undergone a lot of advancements recently. To improve IR sensor performance, a lot of research highlighting the utilization of quantum dots and two-dimensional materials such as graphene has been done. These materials provide better responsivity and a wider spectral range than traditional semiconductor-based detectors.

Both military and civil defense systems are currently using well-developed designs. Homeland security is included in civil defense, whereas tactical and strategic systems are used in military applications. Effective target detection and tracking is a prerequisite for using infrared sensor technology for space and missile defense, but challenges remain. The passive operation, low mass, low power consumption, and effectiveness of infrared sensors make them valuable in missile defense engagements. Nanotechnology is predicted to rapidly develop since it provides IR components with useful material and physical features.

Current detectors are bulky as they require cooling mechanisms. Current uncooled mercury cadmium telluride (MCT) based detectors provide very low resolution as their pixel size is larger than 15 μm.

Future developments in infrared sensor technology is crucial as the need for both public and military defense becomes more demanding. The current priorities for IR imaging system development are cost reduction and performance enhancement. Since these tiny sensors may be arranged in high-resolution arrays with pixel sizes significantly lower than those achievable with traditional technologies, the integration of nanoscale sensors in infrared imaging represents a promising advance. This miniaturization provides finer details and quicker reaction times, which also has the potential to lower production costs through mass manufacturing methods.

Since IR simulators can lower safety risks and costs associated with concept analysis, principal establishment, and performance evaluation, they are increasingly being used for developing and evaluating IR sensor systems. The progress in computing systems and numerical methods make it possible to employ sophisticated software to solve difficult mathematical problems with boundary conditions that correspond to physical realities. One example of this software is COMSOL Multiphysics, which is a robust Finite Element Method (FEM) tool for solving Partial Differential Equations (PDEs).

Thus, a camera including sensors to detect MWIR which solves the aforementioned problems is desired.

SUMMARY

The present subject matter relates to a high-resolution infrared (IR) imaging system having an array of nano sensors made of pixel elements. Each pixel in the array can be smaller than 10 μm by 10 μm. This system may be optimized for operating in the middle-wave infrared (MWIR) spectrum, specifically within 3 μm to 5 μm. Infrared-sensitive materials, including but not limited to vanadium oxide (VOx) or molybdenum disulfide ($MoS_2$), may be coated on each nano sensor to improve sensitivity and performance. The imaging system may be capable of functioning without an additional cooling mechanism. The lack of a cooling system may minimize the total bulk and complexity associated with conventional infrared detectors. Furthermore, the system may be designed to have a pixel reaction time of 10 milliseconds, facilitating swift data collection and analysis.

In an embodiment, the present subject matter may relate to a nano sensor having a length, a width, and a depth, wherein the nano sensor may extend from a support structure. The nano sensor may include a pixel on a portion of the nano sensor. The nano sensor may be coated with an infrared sensitive material and the nano sensor may be tunable by varying a thickness of the infrared sensitive material.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
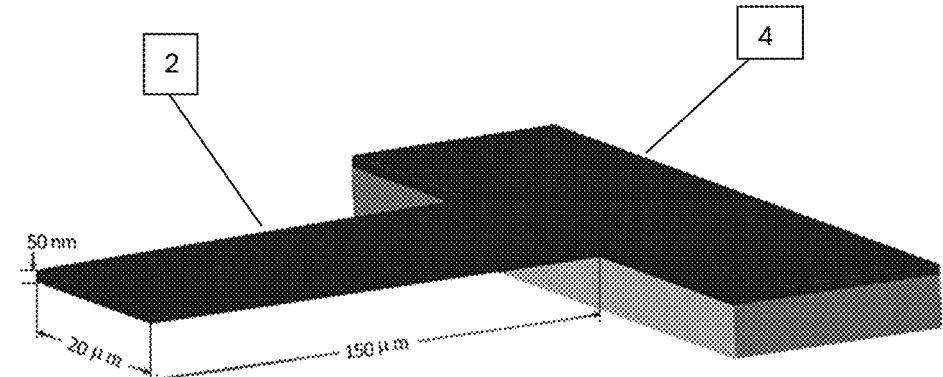
FIG. 1 is an implementation of a single pixel.
Figure 1:

The following definitions are provided for the purpose of understanding the present subject matter and for construing the appended patent claims.

Definitions

Throughout the application, where devices are described as having, including, or comprising specific components, or where processes are described as having, including, or comprising specific process steps, it is contemplated that implementations of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

As used herein, a "pixel" refers to any number of small discrete sensors that together constitute an overall image. Typically, a pixel is the smallest unit of an overall image or graphic that can be displayed. As described herein, each pixel element corresponds to a pixel in a final IR image.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a high-resolution infrared (IR) imaging system including an array of nano sensors including pixel elements.

In an embodiment, the present subject matter relates to a nano sensor having a length, a width, and a depth, wherein the nano sensor may extend from a support structure. The support structure may be the made from the same fabrication material as the nano sensor. The nano sensor may include a pixel on a portion of the nano sensor. The nano sensor may be coated with an infrared sensitive material and the nano sensor may be tunable by varying a thickness of the infrared sensitive material. In various embodiments, the nano sensors may be made of crystalline material such as, by way of non-limiting example, silicon, silicon nitride, silicon oxide, sapphire, aluminum and polymer. Nano sensors made using other suitable materials are further contemplated herein.

In certain embodiments, the infrared sensitive material is selected from the group consisting of vanadium oxide ($VO_2$) and molybdenum disulfide ($MoS_2$). Vanadium oxide may be represented as $VO_2$ or VOx, which representations can be used interchangeably herein. When VOx is coated on the nano sensors herein and exposed to infrared radiation, it absorbs the energy of the radiation, which increases its temperature. The increase in temperature causes a deformation in the structure of the nano sensors, due to the thermal expansion of the VOx coating.

In additional embodiments, each pixel in the present imaging systems, arrays, and nano sensors may have a size smaller than 10 μm by 10 μm.

In still another embodiment, the nano sensors as described herein can have a length of 150 μm, a width of 20 μm, and a depth of 50 μm. In various embodiments, the dimensions of the nano sensor may be different depending on the application of the sensor or intended size of the device. Different dimensions of the nano sensor and/or the coating on the sensor may allow the nano sensor to absorb different wavelengths of infrared light.

In other embodiments, the thickness of the infrared sensitive material may be at least about 2 nm, at least 2 nm, about 2 nm, or 2 nm.

In other embodiments, the present subject matter may relate to an infrared (IR) imaging system. The system may include an array of nano sensors, and the nano sensors may include pixels. The nano sensors may be coated with an infrared sensitive material selected from the group consisting of vanadium oxide (VOx) and molybdenum disulfide (MoS₂). The system may also operate on a middle-wave infrared (MWIR) structure.

The overall size of the camera may be 1 cm×1 cm, and each nano sensor may be tuned to different infrared wavelengths. In various embodiments, the middle-wave infrared (MWIR) spectrum may be within about 3 μm to about 5 μm. The camera may be a combination of various elements such as IR compatible optics, IR detectors, amplifiers, signal conditioning circuitry, signal integrators, display units, etc. The present subject matter is focused on the IR detector which is made of an array of nano sensors. In various embodiments of a camera, each pixel may be made of an individual nano sensors which would be coated with an infrared sensitive material such as vanadium oxide (VO₂)

The pixels and nano sensors may be made with different shapes in various embodiments.

In various embodiments, the pixels have a size up to 10 μm by 10 μm.

In other embodiments, the system may not include a cooling mechanism. That is, the present system may maintain a sufficient temperature without requiring use of any such cooling mechanism.

In various embodiments, each pixel within the system may have a response time of 10 milliseconds.

In still other embodiments, the present systems and/or array of nano sensors may include over one thousand nano sensors including pixels.

In certain embodiments, the present systems and/or array of nano sensors may have dimensions of 1 cm by 1 cm.

Each nano sensor may include a different thickness of infrared sensitive material. Each nano sensor may also have different dimensions. Varying the size of the nano sensors and the thickness of the infrared sensitive material may allow each individual nano sensor in the system to be tuned to a different wavelength of infrared light in the MWIR2 band.

The present subject matter may relate to a camera including the infrared (IR) imaging system. In various embodiments, the camera, including various components of the camera as previously described, may have a size of 1 cm by 1 cm.

In other embodiments, the present systems may be tested by producing infrared light through commercial quantum cascade lasers (QCLs). The QCLs may be tunable and provide optical power of up to 20 mW with a range of IR tenability in MWIR2 and LWIR3 bands.

The present subject matter may also relate to a low noise electronic device comprising field-programmable gate arrays (FPGAs) using the pixels as described herein.

The present subject matter may further relate to a method of constructing a complete IR image using image processing techniques. In this regard, this method may include taking data from each pixel of the system. The data may be retrieved from each pixel simultaneously. The image processing techniques may include selecting a software from a group consisting of MATLAB and VHDL (VHSIC Hardware Description Language).

The present subject matter may be further understood by referring to the following Examples.

EXAMPLES

Figure 2A:
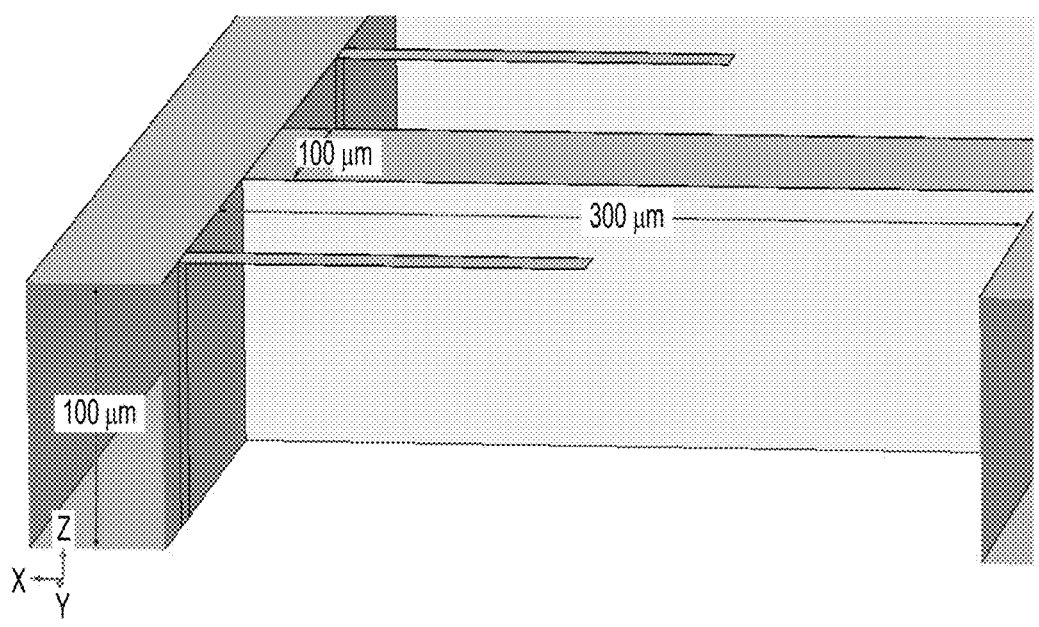
FIG. 2a is a cross section of an implementation of an array model.
Figure 2B:
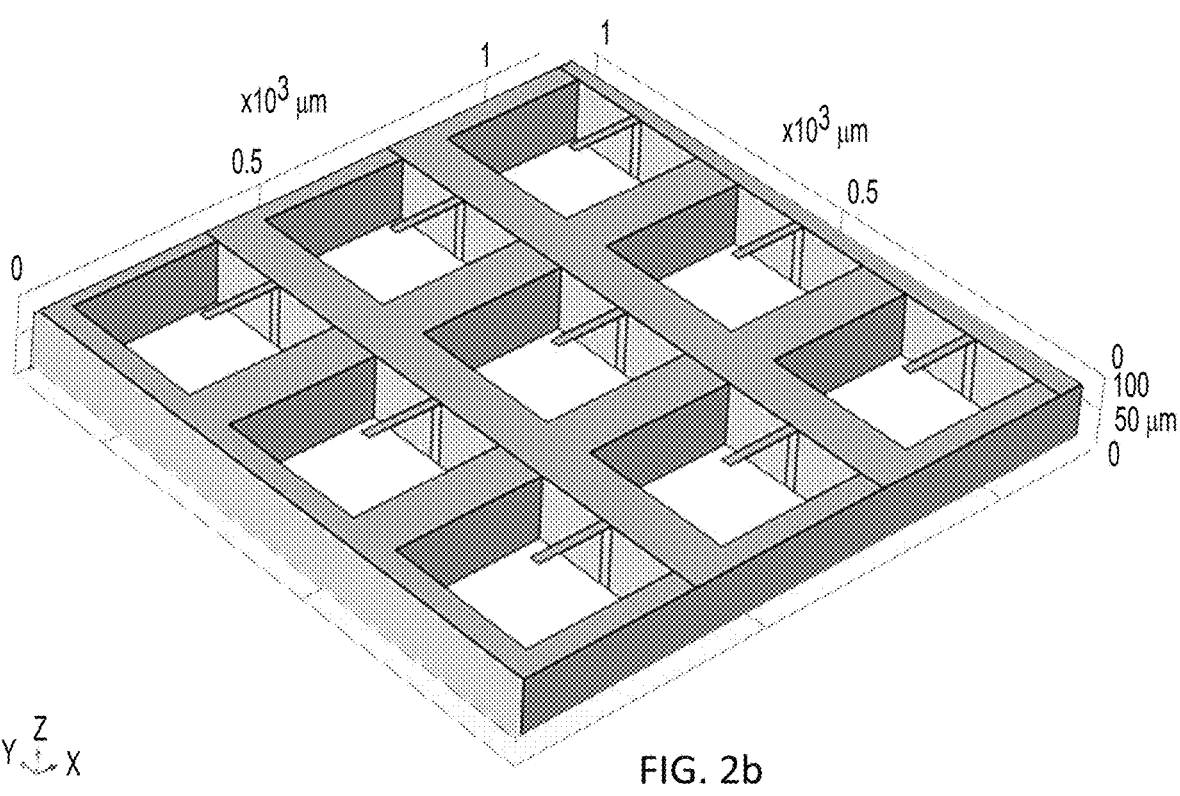
FIG. 2b is a top view of an implementation of a 3×3 array model.

In the modelling process, the sensor was designed with the following dimensions: the sensor 2 has a length of 150

μm, a width of 20 μm, and a depth of 50 nm as illustrated in FIG. 1. The sensor is made with a supporting structure 4. The array may include a depth of 100 μm with each nano sensor occupying a space having a dimension of 300 μm by 300 μm and a spacing between each nano sensor of 100 μm as illustrated in FIG. 2a. The overall size of a 3×3 array of nano sensors is 1000 μm by 1000 μm as illustrated in FIG. 2b.

Simulations were conducted to test the radiative heat flux, conducting heat flux, temperature, and displacement, as well as a plot of the relationship between radiative power and VOx deformation. The simulations were conducted on COMSOL software.

Figure 3A:
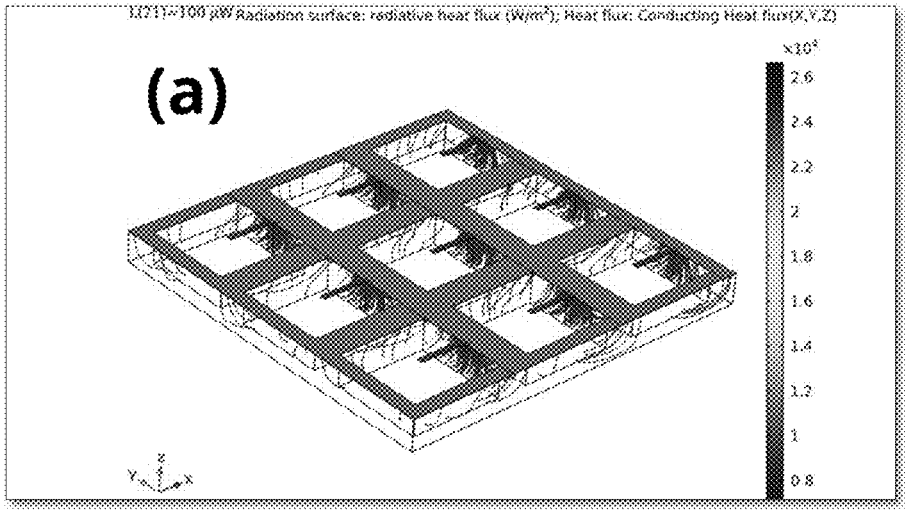
FIG. 3a is a perspective view of a model of surface radiative heat flux and conducting heat flux in an implementation of an array.
Figure 3B:
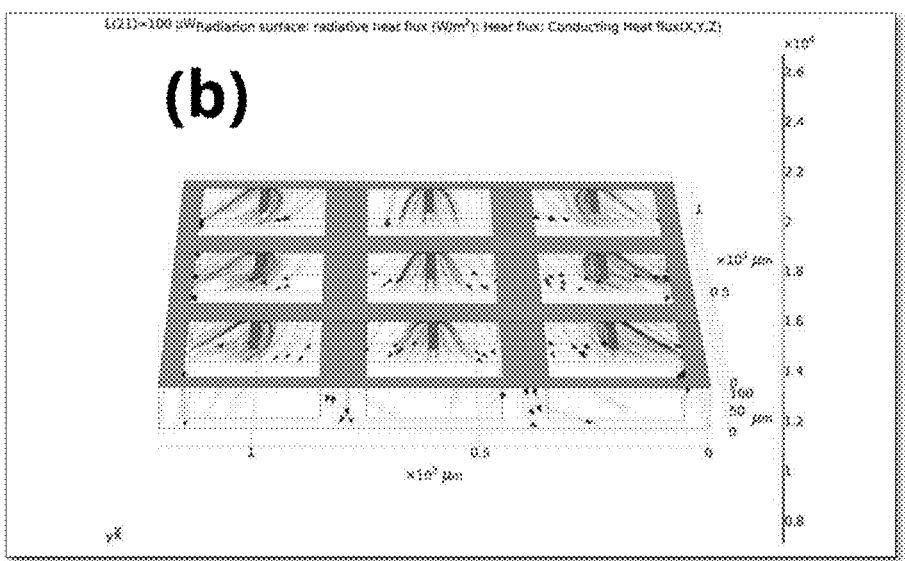
FIG. 3b is a front perspective view of a model of surface radiative heat flux and conducting heat flux in an implementation of an array.
Figure 3C:
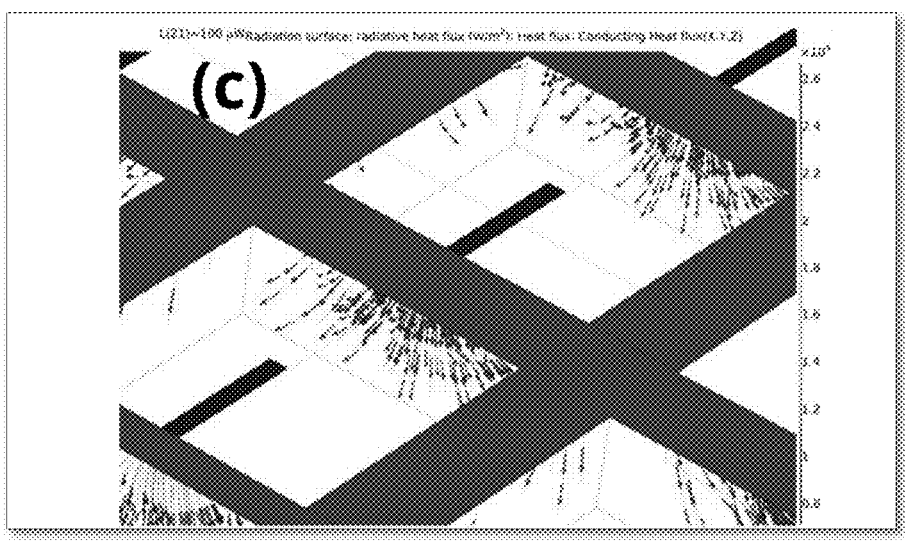
FIG. 3c is a detailed view of the conducting heat flux in an implementation of an array.

FIGS. 3a-3c show radiative heat flux and conducting heat flux. Radiative heat flux simulations show the sum of radiative and convective energy absorbed at a solid surface. From the plot, it is illustrated that the actual surface radiative heat flux of the VOx thin film is about $2.6×10^4$ W/m².

Figure 4:
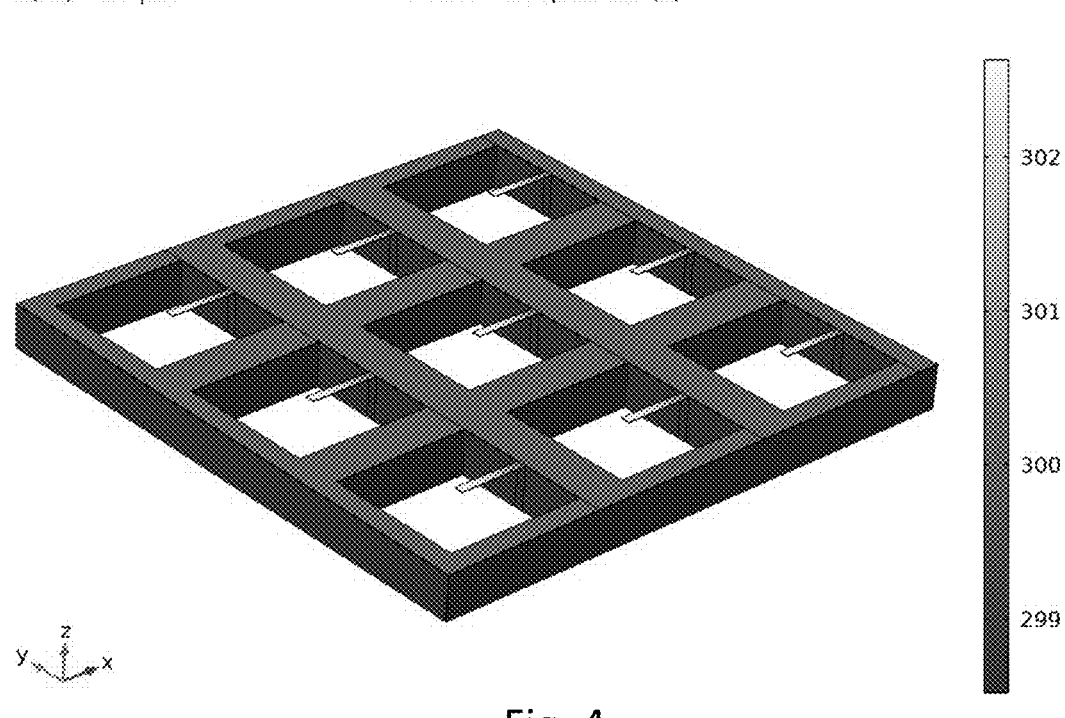
FIG. 4 is a top perspective view of a model surface temperature result at steady state under 100 μW conditions in an implementation of an array.
Figure 5:
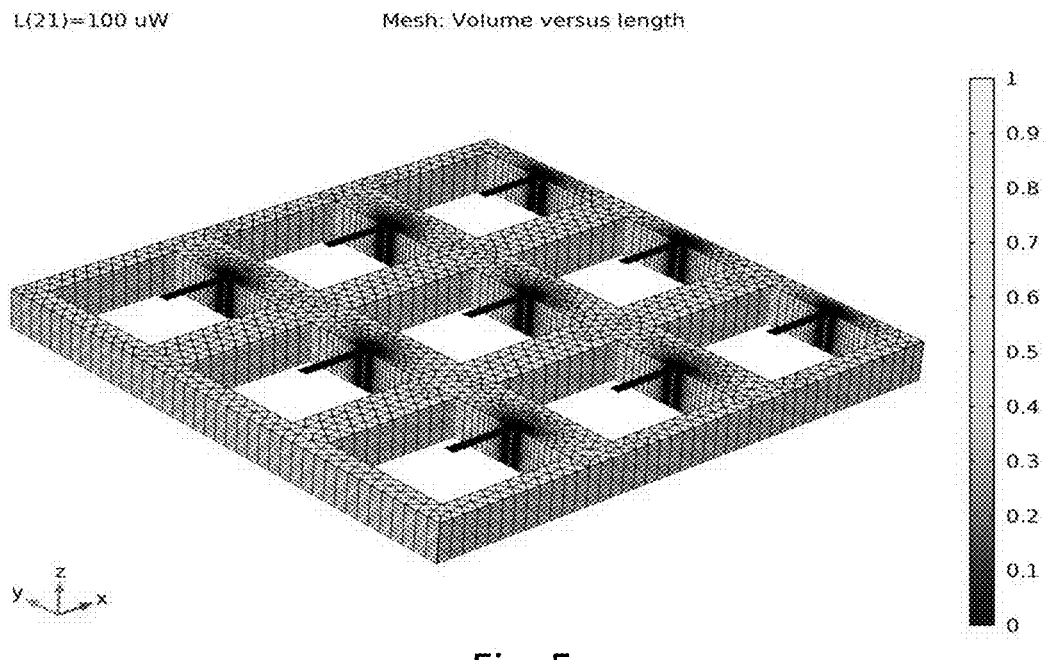
FIG. 5 is a model of the mesh in volume versus length of an implementation of an array.

FIG. 4 illustrates the results from a simulation demonstrating surface temperature of the array under steady state temperature under 100 μW. Surface temperature simulation is important for infrared sensors because it allows for more accurate measurements of land surface temperature. By simulating actual IR images obtained by thermal equipment, researchers can verify methods for temperature estimation and improve the performance of infrared sensors FIG. 5 illustrates the mesh of the array looking at volume versus length. The mesh resolution and mesh element quality are important aspects to consider when validating a model. Low mesh resolution—in relation to the variations in the solution and the geometry—can lead to inaccurate results. A low mesh element quality—which measures the regularity of the mesh elements' shapes—can lead to inverted mesh elements and to high condition numbers for the Jacobians, which in turn can cause convergence issues. The mesh element quality is a dimensionless quantity between 0 and 1, where 1 represents a perfectly regular element, in the chosen quality measure, and 0 represents a degenerated element. Here, the mesh quality was above 0.5 up to 1.

Figure 6:
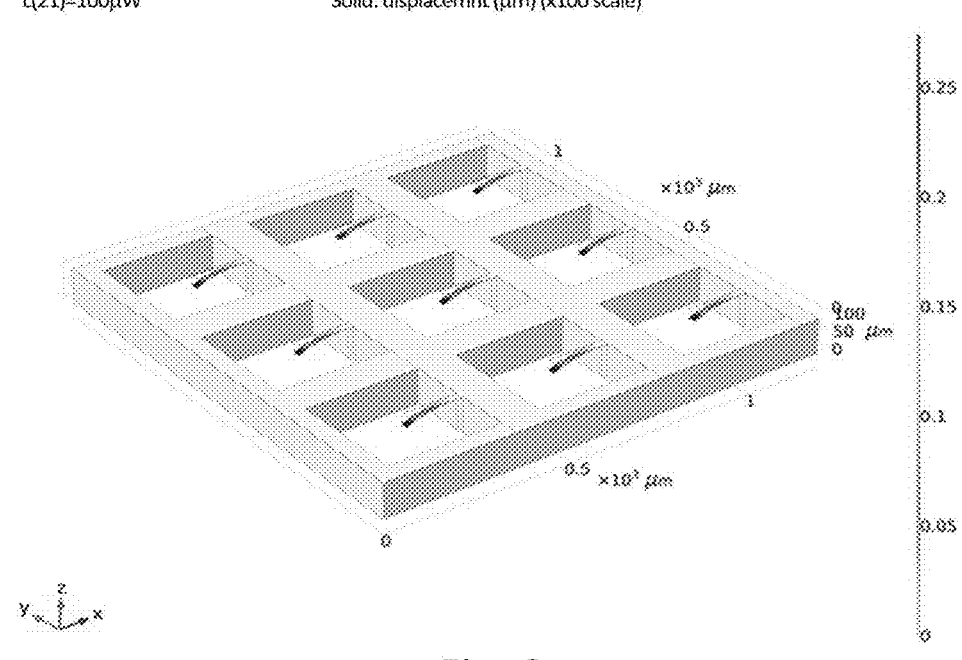
FIG. 6 is a model of the displacement result of an implementation of an array at steady state under 100 μW conditions.
Figure 8:
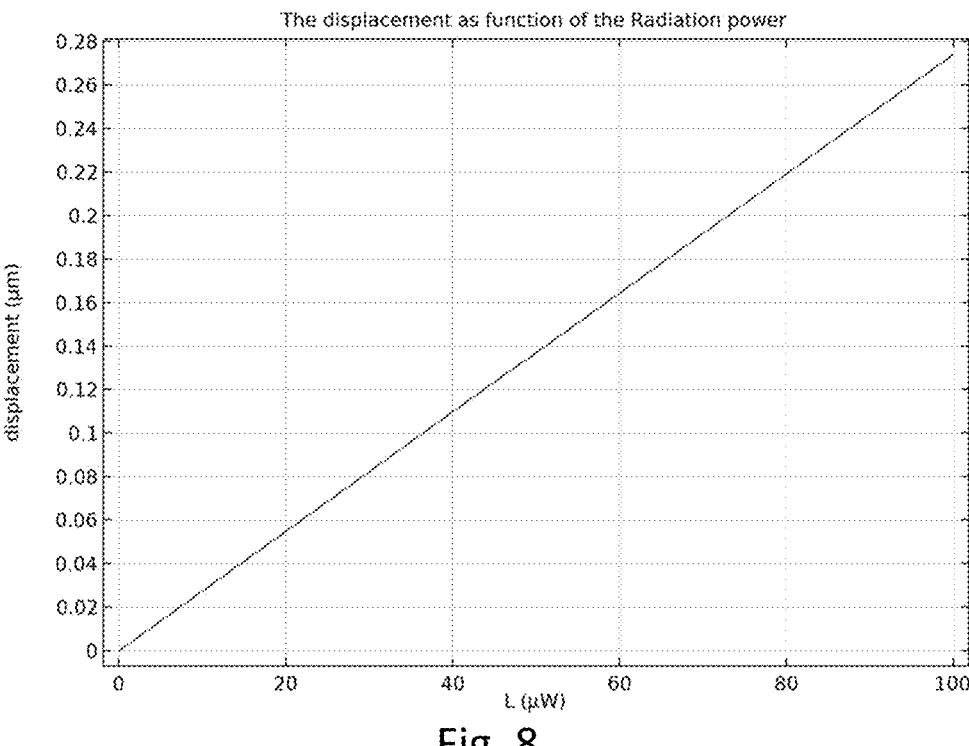
FIG. 8 is a graph showing the response of the nano sensor displacement as a function of radiation power in an implementation of an array.

Referring to FIG. 6, the displacement result of the structure at steady state under the 100 μW condition is illustrated. Referring to FIG. 8, a detailed view of the deformation result of the structure at steady state under 0 to 100 μW condition is illustrated. Steady-state simulation is important for infrared sensors because it provides a simpler mathematical model that is easier to understand and more adaptable to custom solution techniques. It calculates the steady state response of a structure subjected to harmonic excitations, delaying structural damage onset and dispersing impact energy, thus enhancing impact resistance.

Figure 7:
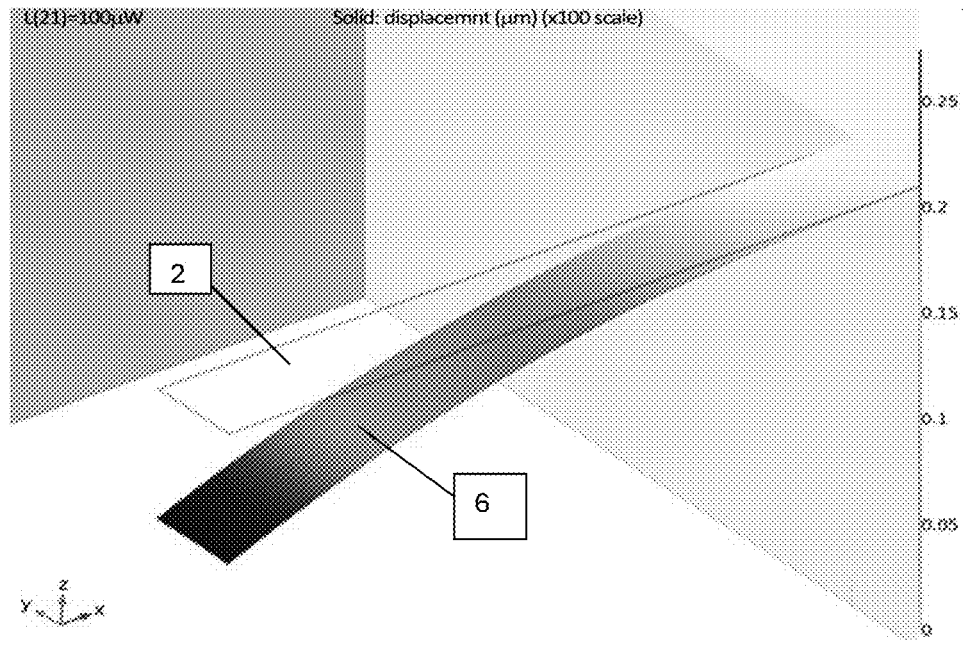
FIG. 7 is a detailed view of a model of the deformation result of an implementation of a nano sensor as described herein at steady state under 100 μW conditions.

FIG. 7 shows the response of the sensor 2. It shows the deflection 6 as a response to IR. The white strip is the original sensor 2 before being irradiated with IR. The deflection is the indicator of the response of the sensor to the IR and the magnitude of the sensor is used to generate the signal for the camera.

FIG. 8 shows the displacement of the nano sensor as a function of the radiation power. From the curve, the slope can be calculated to be about 2.7 nm/μW. The linearity of the slope indicates the close association between the radiation power and displacement of the nano sensor.

It is to be understood that the tunable MWIR camera using pixels with nano sensors is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A nano sensor array comprising:
   a plurality of nano sensors, each nano sensor being made from a crystalline material and having a length, a width, and a depth;
   a support structure from which each of the plurality of nano sensors extends, the support structure being made from the crystalline material;
   each nano sensor element in the array corresponding to a single pixel, whereby each nano sensor element produces one pixel value in an image; and
   an infrared sensitive material coated on each of the plurality of nano sensors;
   wherein each of the plurality of nano sensors is independently tunable by varying a thickness of the infrared sensitive material coated thereon.

2. The nano sensor array of claim 1, wherein the infrared sensitive material is selected from the group consisting of vanadium oxide (VOx) and molybdenum disulfide (MoS$_2$).

3. The nano sensor array of claim 1, wherein the length of each of the plurality of nano sensors is 150 μm, the width of each of the plurality of nano sensors is 20 μm, and the depth of each of the plurality of nano sensors is 50 μm.

4. The nano sensor array of claim 1, wherein the thickness of the infrared sensitive material on each of the plurality of nano sensors is at least about 2 nm.

5. A low noise electronic comprising field-programmable gate arrays (FPGAs) using the pixels of claim 1.

6. An infrared (IR) imaging system, comprising:
   an array of nano sensors, each nano sensor being made from a crystalline material and having a length, a width, and a depth, each individual nano sensor element of the array of nano sensors corresponding to a single pixel, whereby one nano sensor produces one pixel value in an image;
   wherein the nano sensors are coated with an infrared sensitive material selected from the group consisting of vanadium oxide (VOx) and molybdenum disulfide (MoS$_2$) and each of the nano sensors is independently tunable by varying a thickness of the infrared sensitive material coated thereon;
   wherein the system operates on a middle-wave infrared structure (MWIR).

7. The imaging system of claim 6, wherein the middle-wave infrared (MWIR) spectrum comprises 3 μm to 5 μm.

8. The imaging system of claim 6, wherein the system does not include a cooling mechanism.

9. The imaging system of claim 6, wherein each pixel within the system has a response time of 10 milliseconds, the response time being the interval between IR absorption and the output signal from a pixel.

10. The imaging system of claim 6, wherein the system comprises at least one thousand pixels.

11. The imaging system of claim 6, wherein the system has dimensions of 1 cm by 1 cm.

12. The imaging system of claim 6, wherein each nano sensor comprises a different thickness of infrared sensitive material.

13. The imaging system of claim 6, wherein each nano sensor comprises a different dimension.

14. The imaging system of claim 6, wherein each nano sensor is tuned to a different wavelength of infrared light in a middle-wave infrared (MWIR) spectrum ranging from about 3 μm to about 5 μm.

15. An infrared camera comprising the imaging system of claim 6.

16. The infrared camera of claim 15, wherein a size of the camera is 1 cm by 1 cm.

17. A method of constructing a complete IR image, the method comprising taking data from each pixel of the system of claim 6 and using image processing techniques to construct the complete IR image.

18. The method of claim 17, wherein the imaging processing techniques comprises a software selected from the group consisting of MATLAB and VHDL (VHSIC Hardware Description Language).

* * * * *